US008233765B2

(12) United States Patent
Gates et al.

(10) Patent No.: US 8,233,765 B2
(45) Date of Patent: *Jul. 31, 2012

(54) AUDIO/VIDEO SYNCHRONIZATION WITH NO CLEANPOINTS

(75) Inventors: Matthijs A. Gates, Seattle, WA (US); Jai Srinivasan, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1334 days.

This patent is subject to a terminal disclaimer.

(21) Appl. No.: 11/868,208

(22) Filed: Oct. 5, 2007

(65) Prior Publication Data

US 2008/0022333 A1 Jan. 24, 2008

Related U.S. Application Data

(63) Continuation of application No. 10/206,159, filed on Jul. 25, 2002, now Pat. No. 7,313,313.

(51) Int. Cl.
*H04N 5/932* (2006.01)

(52) U.S. Cl. ........ 386/200; 386/201; 386/202; 386/203; 386/207; 386/211

(58) Field of Classification Search .................. 386/220, 386/201, 202, 203, 207, 211
See application file for complete search history.

(56) References Cited

U.S. PATENT DOCUMENTS

| | | | | |
|---|---|---|---|---|
| 5,596,420 | A * | 1/1997 | Daum | 386/241 |
| 6,411,664 | B1 * | 6/2002 | Usui et al. | 375/343 |
| 6,636,270 | B2 * | 10/2003 | Gates et al. | 348/512 |
| 6,714,720 | B1 | 3/2004 | Lightstone | |
| 6,744,815 | B1 | 6/2004 | Sackstein | |
| 7,106,943 | B2 | 9/2006 | Katayama | |
| 7,143,177 | B1 * | 11/2006 | Johnson et al. | 709/231 |
| 7,254,310 | B2 * | 8/2007 | Gates et al. | 386/201 |
| 7,313,313 | B2 | 12/2007 | Gates | |
| 7,471,337 | B2 * | 12/2008 | Wells et al. | 348/515 |
| 7,471,870 | B2 * | 12/2008 | Bradstreet et al. | 386/248 |
| 2003/0235391 | A1 * | 12/2003 | Gates et al. | 386/46 |
| 2004/0028042 | A1 | 2/2004 | Srinivasan | |
| 2006/0193454 | A1 * | 8/2006 | Abou-chakra et al. | 379/90.01 |

OTHER PUBLICATIONS

Notice of Allowance dated Jul. 31, 2007 cited in U.S. Appl. No. 10/206,159.
IEEE Broadcast Cable and Consumer Electronic Society, "IEEE Transactions on Broadcasting", 7 pgs., vol. BC-28, No. 1, Mar. 1982.
Supplemental Notice of Allowability dated Sep. 4, 2007 cited in U.S. Appl. No. 10/206,159.

* cited by examiner

*Primary Examiner* — Helen Shibru
(74) *Attorney, Agent, or Firm* — Workman Nydegger

(57) ABSTRACT

A computing system that has access to a streamed multimedia sample that is stored on a storage medium applies a zero-based presentation timestamp numbering scheme to the data packets of the multimedia sample, on-the-fly, and after each seek operation. After seeking to a desired starting point, the computing system reads ahead a maximum number of data packets within each media stream of the multimedia sample. A smallest timestamp (normalizing presentation timestamp) is identified and then subtracted from the timestamps of the data packets that are transmitted to the appropriate rendering devices, thereby creating appropriate presentation timestamps for the data packets for synchronizing the playback of the multimedia sample.

20 Claims, 4 Drawing Sheets

AUDIO/VIDEO SYNCHRONIZATION WITH NO CLEANPOINTS

CROSS REFERENCE TO RELATED APPLICATIONS

This application is a continuation of U.S. patent application Ser. No. 10/206,159, filed Jul. 25, 2002, and entitled AUDIO/VIDEO SYNCHRONIZATION WITH NO CLEANPOINTS. The present application claims priority to the foregoing application, which is incorporated herein by reference in its entirety.

BACKGROUND OF THE INVENTION

1. The Field of the Invention

The present invention is directed to synchronizing audio and video data and, more particularly, to synchronizing streamed audio and video data during seek operations.

2. Related Technology

A multimedia sample often includes discrete audio and video data packets that are assigned time stamps corresponding to a desired presentation of the multimedia. This is useful for synchronizing the audio and video content of the multimedia so that it can be rendered in the desired manner and sequence.

One method for synchronizing audio and video data is practiced with the use of cleanpoints. A cleanpoint refers to a point, within multiplexed multimedia content, from which a clean or synchronous playback of the multimedia can start. For example, a cleanpoint indicates a point in which the corresponding streams of data (e.g. audio and video) are synchronized. Typically the cleanpoints have synchronized Presentation TimeStamps (PTS)s that are assigned to the audio and video content, indicating when the audio and video content should be rendered to achieve the desired presentation.

Cleanpoints are extensively used when recording the multimedia content in a fixed medium, such as a DVD, for enabling the viewer to seek around in the multimedia presentation, without disrupting the syncing of the audio and video content. In a Digital Video Disk (DVD), for example, cleanpoints are established between groups of Video OBject Units (VOBUs) that are contained within the multimedia sample. Typically, the cleanpoints are established at the beginning of each Video OBject (VOB) that includes one or more VOBUs. Corresponding audio and video PTS are typically contained within individual VOBs, such that a viewer may seek to any VOB boundary, from which synchronized playback of the audio and video may be obtained.

Despite the utility of cleanpoints, they are often not used with streaming data because streaming data is typically delivered on a ready to be rendered basis. Instead, streaming data is typically synchronized to timestamps that are assigned to the individual data packets of the multimedia stream, which enables the audio and video data to be rendered at the appropriate time. This works well when the presentation of the multimedia is played as it is received or when it is started from the beginning of the presentation because the audio and video data can be rendered according to their corresponding timestamps, based upon a beginning PTS of zero. Thereafter, it can be determined when to play all subsequently received audio and video data packets based on their corresponding timestamps with respect to the beginning PTS of zero.

The absence of cleanpoints can be a problem, however, when the streamed data is recorded and seeked around because the audio and video content is sometimes delivered in an asynchronous manner to accommodate the manner in which the data is decompressed, such that the timestamps assigned to the audio and video data cannot solely be used to synchronize the multimedia content, as described below.

Decompression of audio data is typically a short and relatively simple process. In contrast, video decompression is a relatively complex process in which certain portions of the video data is often decompressed, cached and then later used to decompress other remaining portions of the video data. Accordingly, audio data may be delivered almost immediately before the time in which it is to be rendered within the media stream, whereas it is often necessary to deliver the corresponding video data prior to the delivery of the audio data. This prior delivery of the video data accommodates the relatively complex and time-consuming procedure of decompressing the video data. This helps to ensure that the video data will be properly decompressed in time to be rendered with the corresponding audio data.

Even though the audio and video packets of a streamed multimedia sample may be timestamped, it may still be difficult to present the audio and video content in sync when the data is being seeked, as mentioned above, and as described in more detail with respect to FIG. 1.

FIG. 1 illustrates a multimedia sample 100 that includes video packets (V1, V2, V3, V4, V5 and V6) and audio packets (A1, A2 and A3). Although not shown, the multimedia sample 100 may also include other video packets and audio packets that are received prior to and subsequent to the data packets that are shown.

The illustrated video data packets and audio data packets correspond with audio and video media streams of the multimedia sample. Accordingly, some of the video data packets and audio data packets are assigned timestamps (t=n, where n is the assigned timestamp), corresponding with a desired presentation of the multimedia sample 100 in which the video and audio media streams are played in synchronization. For example, video data packet V2 is assigned a timestamp t=5, audio data packet A1 is assigned a timestamp t=4, video data packet V4 is assigned a timestamp t=6, audio data packet A2 is assigned a timestamp t=5, video data packet V5 is assigned a time stamp t=7, and audio data packet A3 is assigned a timestamp t=6. When the multimedia sample 100 is played in synchronization, the audio data packet A2 will be rendered at the same time as video data packet V2.

The problem with synchronizing the multimedia sample 100 becomes evident when a viewer seeks to a location within the sample 100, such as location 110. For example, when the reader is seeked to starting point 110 to commence playback of the multimedia sample 100, it is unclear where or when the playback of the multimedia content should actually begin to enable synchronous playback. In particular, it is unclear whether the playback should commence at video data packet V2 or at some other location.

Renderers typically prefer to receive zero-based PTS numbering scheme for the multimedia data that is to be rendered. However, when the playback of the multimedia content commences at a starting point that is not a cleanpoint, then it becomes unclear how to create a zero-based PTS scheme that will synchronize the media streams of the multimedia sample 100. For example, in the present case, it is unclear which data packet(s) should be assigned a PTS of zero and how the remaining timestamps should be renumbered to satisfy the appropriate rendering devices with a zero-based PTS numbering scheme.

If a PTS of zero is merely assigned to the first encountered video and/or audio data packet(s), then the multimedia presentation may be played out of sync. For instance, if video data packet V2 and audio data packet A1 are assigned PTSs of zero, then they will be played at substantially the same time upon being transmitted to the appropriate rendering devices, even though audio data packet A1 has a timestamp (t=4) that is less than the timestamp assigned to video data packet V1 (t=5). Accordingly, merely assigning a PTS of zero to each of the first encountered audio and video data packets can result in the multimedia stream being played out of sync.

When the multimedia stream includes cleanpoints, the cleanpoints may be used to synchronize the various streams of the multimedia content. However, as described above, some streaming multimedia samples do not include cleanpoints, thereby making it difficult to synchronize the various media streams of the multimedia, as described above. Furthermore, even when the multimedia sample includes cleanpoints, it can still be difficult to synchronize the streams of the multimedia when the playback commences at any starting point that is not a cleanpoint.

Accordingly, there currently exists a need in the art for improved methods and systems for synchronizing streaming multimedia.

BRIEF SUMMARY OF THE INVENTION

The present invention is directed to improved methods, systems and computer program products for synchronizing the playback of streamed multimedia from a starting point that may not include a cleanpoint.

According to one aspect of the invention, a computing system such as a Programmable Video Recorder (PVR) accesses streamed multimedia data from a storage medium in response to a seek operation that causes the streamed multimedia data to be played back commencing at a starting point that is seeked for within the multimedia data. The streamed multimedia data includes at least two media streams such as, but not limited to, an audio stream and a video stream that are composed of a plurality of data packets.

According to one embodiment, at least some of the data packets include timestamps that correspond with a synchronized and intended playback of the multimedia data.

Upon seeking to a desired starting point within the streamed multimedia data, the computing system identifies a normalizing Presentation TimeStamp (PTS) upon which to base the playback of the multimedia data. The normalizing PTS is identified by determining the total number of media streams within the multimedia data, reading ahead a maximum number of data packets within each of the media streams, and identifying the smallest original timestamp (the normalizing PTS) that is assigned to a data packet within the maximum number of data packets from all the streams.

The normalizing PTS is then subtracted from the original timestamps that are assigned to the data packets, in all streams. This causes the smallest original timestamp to be set to zero and the other timestamps to be correspondingly renumbered according to a zero-based PTS numbering scheme, which is desired by the rendering devices.

The data packets are then transmitted to the appropriate rendering devices where they are rendered according to their newly assigned presentation timestamps. In this manner, the media streams of the multimedia data may be rendered in synchronization, even when the playback of the multimedia commences from a starting point that is not a cleanpoint.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
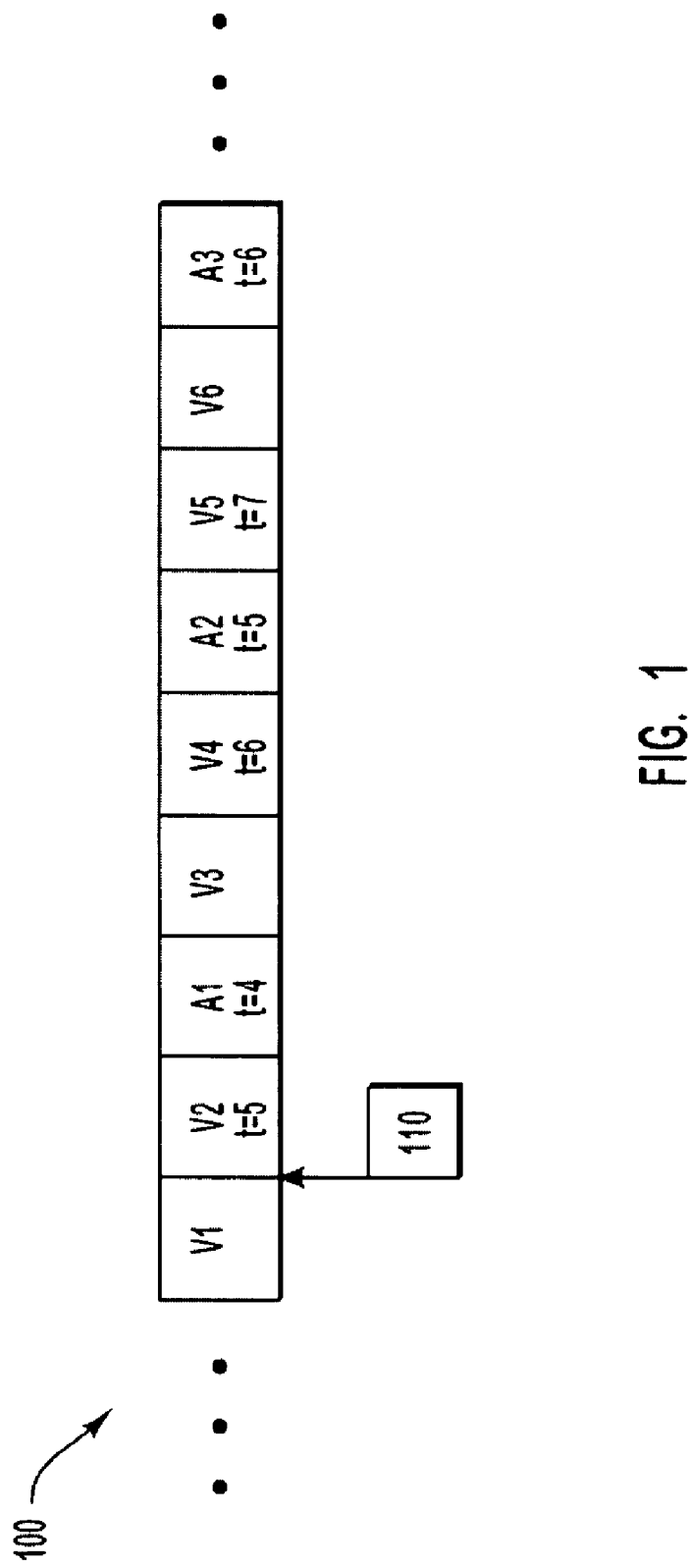
FIG. 1 illustrates an embodiment of a multimedia data sample that includes audio data packets and video data packets, in which some of the data packets include timestamps.

The present invention extends to improved methods, systems and computer program products for synchronizing the playback of recorded multimedia from a starting point that may not include a cleanpoint.

According to one aspect of the invention, a computing system such as a Programmable Video Recorder (PVR) has access to multimedia data that is recorded in a storage medium. Upon receiving instructions to playback at least a portion of the multimedia sample commencing at a desired starting point, the computing system applies a zero-based Presentation TimeStamp (PTS) numbering scheme to the data packets of the media streams that are included in the multimedia sample. This generally enables the media streams of the multimedia sample to be played back on appropriate rendering devices in synchronization, commencing at the desired starting point.

The embodiments of the present invention may comprise a general-purpose or special-purpose computing system including various computer hardware components, which are discussed in greater detail below. Embodiments within the scope of the present invention also include computer-readable media for carrying or having computer-executable instructions, computer-readable instructions, or data structures stored thereon. Such computer-readable media may be any available media, which is accessible by a general-purpose or special-purpose computing system. By way of example, and not limitation, such computer-readable media can comprise physical storage media such as RAM, ROM, EPROM, CD-ROM or other optical disk storage, magnetic disk storage or other magnetic storage devices, or any other media which can be used to carry or store desired program code means in the form of computer-executable instructions, computer-readable instructions, or data structures and which may be accessed by a general-purpose or special-purpose computing system.

The term "network," as defined herein, includes any architecture where two or more computing systems may exchange data with each other. When information is transferred or provided over a network or another communications connection (either hardwired, wireless, or a combination of hardwired or wireless) to a computing system or computer device, the connection is properly viewed as a computer-readable medium. Thus, any such connection is properly termed a computer-readable medium. Combinations of the above should also be included within the scope of computer-readable media. Computer-executable instructions comprise, for example, instructions and data which cause a general-purpose computing system or special-purpose computing system to perform a certain function or group of functions.

The term "computing system," as described herein, is defined as one or more software modules, one or more hardware modules, and any combinations thereof that work together to perform operations on electronic data. For example, the definition of computing system may include hardware components, as well as software modules for executing computer-executable instructions. The computing system may include one or more computers coupled via a computer network. Likewise, the computing system may include a single physical device (such as a Programmable Video Recorder "PVR") where internal modules (such as a memory and processor) work together to perform operations on electronic data.

Those of ordinary skill in the art will appreciate that the invention described herein may be practiced in network computing environments with many types of computing system configurations, including personal computers, laptop computer, hand-held devices, multi-processor systems, microprocessor-based or programmable consumer electronics, network PCs, minicomputers, mainframe computers, mobile telephones, PDAs, and the like. The invention may also be practiced in distributed computing environments where local and remote computing systems, which are linked (either by hardwired links, wireless links, or by a combination of hardwired or wireless links) through a communication network, both perform tasks. In a distributed computing environment, program modules may be located in both local and remote memory storage devices.

Figure 2:
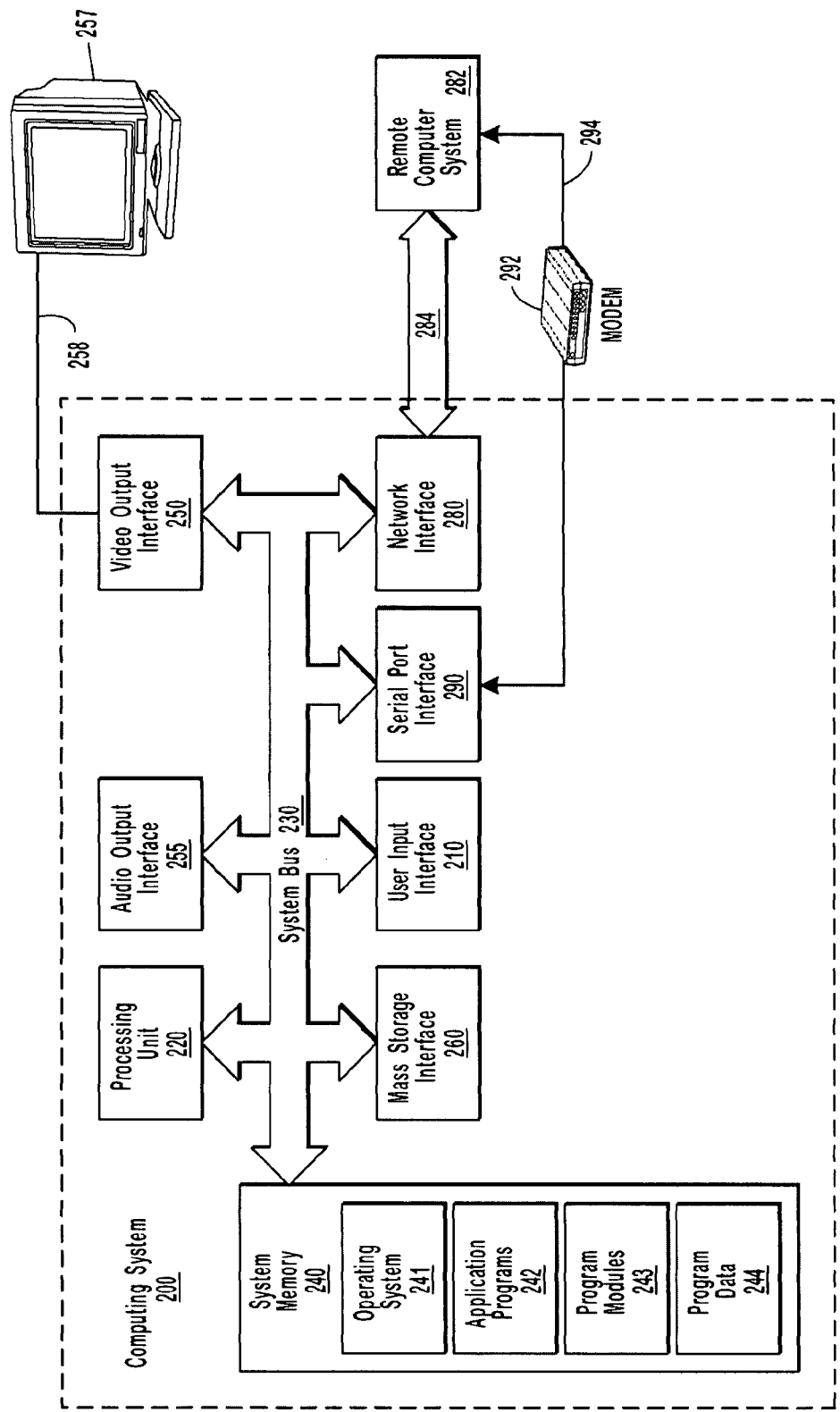
FIG. 2 illustrates an example of a computing system that provides one suitable operating environment for practicing the present invention.

With specific reference to FIG. 2, an example of one computing system 100 that may be used to implement the principles of the invention is illustrated. According to the present embodiment, the computing system 100 may be a PVR that has been adapted to perform the operations that are disclosed herein.

FIG. 2 and the following discussion are intended to provide a brief, general description of one example of a suitable computing environment in which the invention may be implemented. Although not required, the invention will be described in the general context of computer-executable instructions, such as program modules, being executed by computing systems. Generally, program modules include routines, programs, objects, components, data structures, and the like, which perform particular tasks or implement particular abstract data types.

As shown, computing system 200 may include user input interface 210, which may receive information from an input device such as, for example, a keyboard, mouse, microphone, or remote control. An input device may be coupled to user input interface 210 so as to enable the entry of information. An input device may transfer information over such a coupling in response to preprogrammed data or user manipulation of the input device.

Computing system 200 includes processing unit 220, which may allow for complex and flexible general-purpose processing capabilities. Processing unit 220 may execute computer-executable instructions designed to implement features of computing system 200, including features of the present invention. Processing unit 220 is coupled via system bus 230, which also interconnects various other system components, such as system memory 240. System memory 240 generally represents a wide variety of volatile and/or non-volatile memories and may include types of memory previously discussed. However, the particular type of memory used in computing system 200 is not important to the present invention. Program code means comprising one or more program modules may be stored in system memory 240. The one or more program modules may include an operating system 241, one or more application programs 242, other program modules 243, and program data 244.

Computing system 200 may also include video output interface 250, which may provide a video output signal to external video display devices, such as monitor 257. Computing system 200 may be integrally positioned with or separate from a video display device such as monitor 257. Monitor 257 may be configured to display items of different sizes and to display items in different colors. Monitor 257 may be further configured to appropriately update displayed items that change in size and/or color dynamically. Monitor 257 may be coupled to video output interface 250 via video link 258 so as to receive a provided video output signal. Examples of other suitable display devices include, but are not limited to, PDA displays, displays of other portable devices, televisions, computer monitors, and so forth.

Similarly, computing system 200 may also include audio output interface 255, which may provide an audio output signal to external audio output devices. Computing system 200 may be integrally positioned with or separate from an audio system, which may include a speaker or other device capable of emitting sound data. An audio system may be coupled to audio output interface 255 so as to receive a provided audio output signal. Non-limiting examples of suitable audio output devices include stereo systems, amplifiers, radios, television audio systems, and so forth.

Computing system 200 may also include mass storage interface 260, which is configured to read data from and to write data to a mass storage device, such as, for example, a magnetic disk storage device (e.g., a Digital Video Disk (DVD), a Compact Disk (CD)), an optical disk storage device, and a computer hard disk drive. A mass storage device may be coupled to mass storage interface 260 so as to enable the reading and writing of data. When a mass storage device is coupled to mass storage interface 260, one or more program modules including operating system 241, application programs 242, other program modules 243, and program data 244 may be stored in the mass storage device.

Computing system 200 may also include network interface 280, through which computing system 200 may receive data from or transmit data to external sources, such as for example, a remote computing system 282 or database. The computing system 200 and the remote computer system 282 may be network connectable to Local Area Networks (LANs) and Wide Area Networks (WANs), such as the Internet, that include external computing systems and databases. The computing system 200 may be connected with the remote computer system 282 through any suitable network communication link 284, as described below. The remote computer system 282 may also be connected to the computer system 200 through a serial port interface 290 and an appropriate modem communication link 294.

As defined herein, the term "communication link" includes any communication path that may enable the transport of electronic data between two entities such as computing systems or modules. The actual physical representation of a communication path between two entities is not important and may change over time. A logical communication link may include portions of a system bus, a local area network, a wide area network, the Internet, combinations thereof, or portions of any other path that may facilitate the transport of electronic data. Communication links may include hardwired links, wireless links, or a combination of hardwired links and wireless links. Communication links may also include software or hardware modules that condition or format portions of data so as to make them accessible to components that implement the principles of the present invention. Such components may include, for example, proxies, routers, firewalls, or gateways. Communication links may also include portions of a Virtual Private Network ("VPN").

While FIG. 2 and the corresponding discussion provide a general description of a suitable computing system in which the invention may be implemented, it will be appreciated that the features of the present invention, as disclosed herein, may be practiced in association with a variety of different system configurations.

Figure 3:
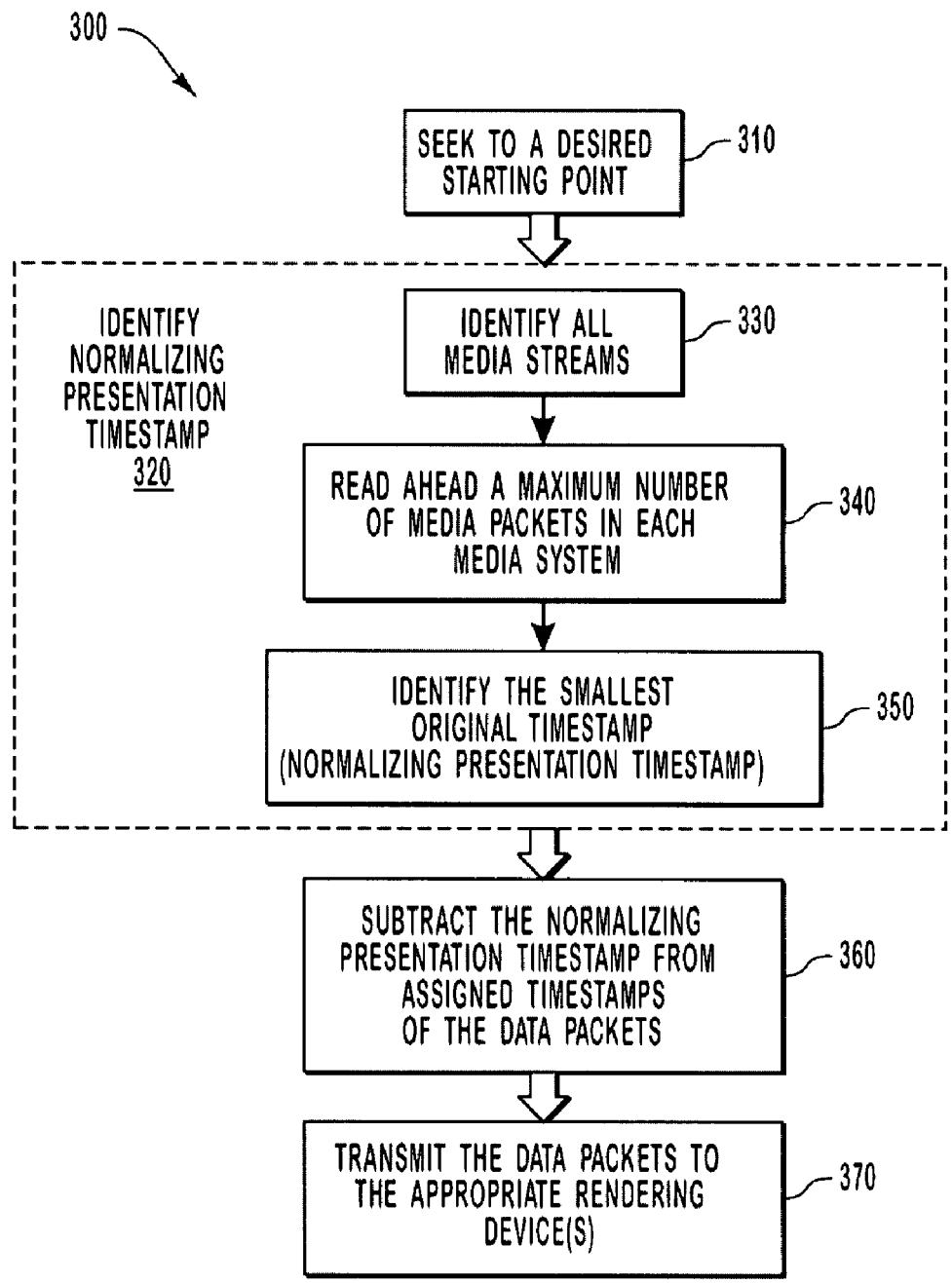
FIG. 3 illustrates a flow diagram of one method for synchronizing media streams of a multimedia data sample.

FIG. 3 illustrates one embodiment of a method 300 for synchronizing the playback of media streams that are included in a recorded multimedia sample. As shown, the present method 300 includes various acts (acts 310, 330, 340, 350, 360 and 370) that may be performed by a computing system for synchronizing the playback of recorded multimedia. Method 300 will now be described in reference to the illustrated acts of FIG. 3 and the multimedia sample 100 of FIG. 1.

The first illustrated act (act 310) of the method 300 is accomplished when the computing system seeks to a desired starting point within a multimedia sample. This may be accomplished, for example, when the computing system accesses recorded multimedia data from a storage medium that is either local or remote to the computing system. The computing system may access the multimedia data, for example, through the mass storage interface 260 that is described above in reference to FIG. 2.

Multimedia sample 100 illustrates one example of a multimedia sample that may be accessed by the computing system. The computing system may seek to a desired starting point (act 310) within the multimedia sample 100 in response to computer instructions that are received directly from user input received through user input interface 210 or indirectly through an application program 242.

According to one embodiment, the desired starting point for commencing playback of the multimedia is a starting point other than a cleanpoint. In other words, the starting point does not include a point in which all of the media streams of the multimedia sample are synchronized. As illustrated in FIG. 1, the desired starting point 110 is not a cleanpoint because video data packet V2 has a timestamp of t=5 and audio data packet A1 has a timestamp of t=4. Accordingly, the first encountered data packets of each the video and audio media streams are not in synchronization. It is typical for audio and video media streams to be transmitted and recorded asynchronously, as described above, for example, to provide ample time for processing the video data, which is often more time consuming than processing the audio data.

Upon seeking to a desired starting point within the multimedia sample (act 310), the method 300 includes the step of identifying a normalizing Presentation TimeStamp (PTS) of the multimedia sample that corresponds with the desired starting point (step 320). Step 320 includes any corresponding acts that may be used for obtaining the desired result of identifying a normalizing PTS. However, in the present embodiment, step 320 includes corresponding acts 330, 340 and 350.

According to one embodiment, the normalizing PTS is used to apply a zero-based PTS numbering scheme to the multimedia sample so that the rendering devices will be enabled to render the multimedia sample as desired, and in synchronization. Rendering devices such as, but not limited to, the display devices and audio devices described above in reference to FIG. 2 desire to receive multimedia data that has a zero-based PTS numbering scheme. A zero-based PTS numbering scheme is generally desirable because it allows the rendering devices to know when the multimedia data is to be rendered with respect to an intended presentation of the multimedia sample in which the media streams of the multimedia sample are rendered in synchronization.

It will be appreciated by those of ordinary skill in the art upon reviewing this description that the multimedia sample that is being played back may include any number of media streams. For instance, in certain embodiments the multimedia sample may include a plurality of audio streams corresponding to different languages or rendering options (e.g., Dolby, Surround Sound, and so forth) for playing the audio content of the multimedia sample in different formats. The multimedia sample may also include a plurality of video streams corresponding with different camera angles and display dimensions for rendering the video of the multimedia sample in different formats. The multimedia sample may also include media streams that correspond with optional effects that may be provided, such as closed captioning graphics, special audio effects, and so forth.

Accordingly, the next act of the present method 300 includes the act of identifying all of the media streams in the multimedia sample (act 330). This act may include identifying all of the media streams that occur in the multimedia sample following the desired starting point, without having to identify media streams that occur in the multimedia sample preceding the desired starting point. For example, in the present embodiment, the act of identifying all of the media streams includes identifying all of the media streams that occur subsequent starting point 110.

For simplifying the manner in which the invention is explained, the multimedia sample 100 illustrated in FIG. 1 only includes two media streams, an audio stream corresponding with audio data packets (A1, A2, A3, and so forth) and a video stream that corresponds with video data packets (V1, V2, V3, and so forth). However, the principles of the present invention may be applied to multimedia samples that have more than two media streams as well.

Upon identifying the various media streams in the multimedia sample, the method 300 of the present embodiment includes the act of reading ahead a maximum number of data packets in each of the identified media streams (act 340). While reading ahead the maximum number of data packets (act 340), the computing system is looking for the smallest original timestamp that is assigned to a data packet (act 350).

Timestamps typically correspond with an intended playback presentation of the recorded multimedia in which the corresponding media streams are played back in synchronization. However, as shown in FIG. 1, only some of the data packets may include timestamps. When rendered, the data packets that do not have assigned timestamps are played according to the relative position within the media stream, with respect to the data packets that do have timestamps.

The maximum number of data packets that are read in each stream while looking for the smallest timestamp (act 340) may vary to accommodate different needs and preferences. In one embodiment, the maximum number of data packets read is in the range from two to twenty. In another embodiment, the maximum number of data packets read is in the range from five to ten. Reading a fewer number of data packets may reduce the resources expended by the computing system and may increase the speed in which the playback can commence. Reading more data packets may increase the accuracy of synchronizing the media streams of the multimedia sample during playback.

According to the embodiment illustrated in FIG. 1, the smallest identified timestamp (t=4) belongs to audio data packet A1, which is the first read data packet of the audio media stream. Accordingly, no matter how many data packets are read from the multimedia sample 100, the smallest timestamp will still belong to audio data packet A1. In other embodiments, the smallest identifiable timestamp may be obtained only upon reading several data samples.

According to one embodiment, the smallest identifiable timestamp represents the normalizing PTS that is applied to the multimedia sample to obtain a desired zero-based PTS numbering scheme. The normalizing PTS is applied in the present embodiment by being subtracted from the originally assigned timestamps of the data packets (act 360). Act 360 may be accomplished at the computing system, for example, immediately prior to transmitting the data packets to the appropriate rendering devices (act 370). However, the invention is not limited to the performance of act 360 at the computing system. For example, in other embodiments the data packets may be transmitted to the appropriate rendering devices (act 370) prior to applying the normalizing PTS. In these other embodiments, the normalizing PTS may be transmitted to the appropriate rendering devices to be applied at the rendering devices. Accordingly to one embodiment, the normalizing PTS is subtracted from every data packet (act 360) that is transmitted to the rendering devices (act 370) following a seek (act 310).

The act of transmitting the data packets to the appropriate rendering devices (act 370) includes transmitting the data packets to rendering devices that are configured for playing the corresponding media streams of the multimedia sample. For instance, with respect to FIG. 1, video data packets V2, V3, V4, and so forth are transmitted to an appropriate video rendering device and audio data packets A1, A2, A3, and so forth are transmitted to an appropriate audio rendering device.

To reduce redundancy and to optimize the reading of the multimedia data from the storage medium, the computing system may queue all of the data packets that are read during the normalizing PTS discovery process. The queued data packets can then later be transmitted to the appropriate rendering devices without having to be read more than once per seek. The read data packets may be queued in the system memory 240 of the computing system 200, for example.

Figure 4:
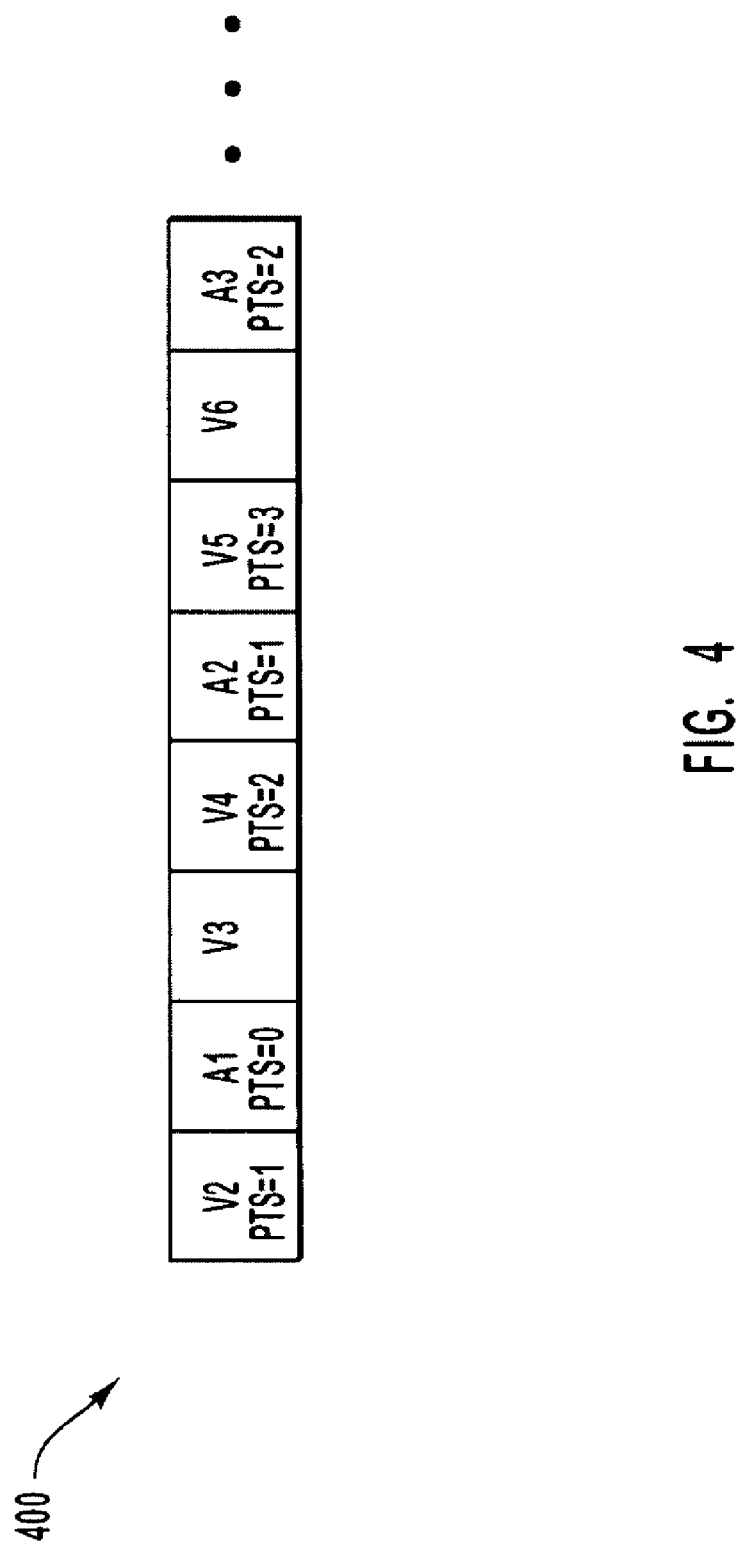
FIG. 4 illustrates an embodiment of the multimedia sample of FIG. 1 in which certain data packets have been assigned presentation time stamps.

As a matter of illustration, FIG. 4 will now be referenced to illustrate how the application of a normalizing PTS may be used to create a zero-based PTS numbering scheme for the multimedia sample 100 of FIG. 1. As shown, the multimedia sample 400 of FIG. 4 is similar to the multimedia sample 100 of FIG. 1, with similar audio and video data packets. However, video data packet V1 is not included because it precedes the desired starting point 110. As shown in FIG. 4, certain audio and video data packets have been assigned Presentation TimeStamps (PTS=n, where n is the value of the presentation timestamp).

Each assigned PTS has been determined by applying the normalizing PTS to the timestamps shown in FIG. 1. For example, video data packet V2 had an original timestamp of t=5 and the normalizing PTS has been determined above to be t=4. Accordingly, the application of the normalizing PTS (t=4) to the original timestamp of video data packet V2 (t=5) results in a new PTS of PTS=1 ((t=5)−(t=4)). This same procedure is followed for all of the remaining data packets of multimedia sample 100 that had original timestamps to obtain the illustrated results in FIG. 4. In particular, audio data packet A1 is assigned a PTS=0 ((t=4)−(t=4)), video data packet V4 is assigned a PTS=2 ((t=6)−(t=4)), audio data packet A2 is assigned a PTS=1 ((t=5)−(t=4)), video data packet V5 is assigned a PTS=3 ((t=7)−(t=4)), and audio data packet A3 is assigned a PTS=2 ((t=6)−(t=4)).

The newly assigned PTSs can then be used to playback the multimedia sample, commencing at the desired starting point, in a desired manner in which the media streams of the multimedia sample are synchronized. For example, in the present embodiment, the video data packet V2 will now be played back at the same presentation time as audio data packet A2, based on their corresponding PTSs of PTS=1. It will also be appreciated that this accomplishes the intended synchronization of the multimedia sample in which video data packet V2 had an original timestamp (t=5) that was the same as the original timestamp of audio data packet A2 (t=5) (see FIG. 1).

One benefit of determining the PTSs of the data packets on-the-fly, as described above, is that a table of PTSs does not have to be maintained and stored to provide the rendering devices with the desired zero-based PTS number scheme. Such a table may incur an unsuitable overhead into the storage medium. Accordingly, rather than storing an expensive table, the present invention enables PTSs to be determined and applied on-the-fly after each seek operation, as described above.

It will also be appreciated that the invention extends to embodiments in which a reader advances through the multimedia sample backwards (i.e., playing back the multimedia sample in reverse). According to one embodiment of the invention, synchronizing the playback of a media sample in reverse includes the act of obtaining a normalizing PTS. The normalizing PTS that is selected for playing the media stream backwards is accomplished in a slightly different manner than the manner described above.

In the present embodiment, the reader first seeks to a desired starting point in the multimedia sample. The reader then reads a maximum number of data samples backwards from the seeked for position. Reading the maximum number of data samples may be accomplished for each of the media streams included in the multimedia sample, as generally described above. However, instead of reading ahead a maximum number of data samples that occur subsequent to the seeked for position (act 340), the present embodiment includes the act of reading backwards the maximum number of data samples that precede the seeked for position.

Next, the largest value of the timestamps is identified and selected as the normalizing PTS. It will be noted that this is different than the previous examples in which the timestamp having the smallest value was selected as the normalizing PTS (act 350). Once the normalizing PTS is identified, a new PTS for each data sample that has an original timestamp is computed by subtracting the original timestamp of the data sample from the normalizing PTS. It will be appreciated that the effect of computing the new PTSs in this manner is that the newly assigned PTSs increase in magnitude the further the reader advances towards the beginning of the multimedia sample. By assigning the PTSs to the data samples in this manner, the rendering device will be able to playback the media sample in reverse, according to the newly assigned PTSs.

Accordingly, it is evident that even though the multimedia sample is being played back in reverse, the methods of the invention still enable the creation of a zero-based PTS numbering scheme that can be used to synchronize the playback of a multimedia stream. This is true, even in the absence of cleanpoints. The utility of being able to synchronize playback in reverse may be particularly useful when there are several video streams that need to be synchronized and when one of the steams has IP data. Synchronizing playback in reverse may also be useful for enabling a user to hear audio in reverse.

In summary, the present invention provides methods, systems and computer program products for synchronizing the playback of multimedia data. More particularly, the present invention enables the creation of a zero-based PTS numbering scheme that is applied on-the-fly for synchronizing the media streams of stored multimedia data. It will be appreciated that although the present invention is particularly well-suited for embodiments in which a desired starting point does not include a cleanpoint, the invention also extends to embodiments in which the desired starting point does include a cleanpoint.

Accordingly, the described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computing system that has access to streamed multimedia data that includes corresponding data packets, wherein at least some of the data packets include original timestamps that corresponds with an intended playback synchronization of the multimedia data, a method for synchronizing the playback of the multimedia data commencing at a starting point that is identified within the multimedia data, the method comprising:
   identifying a desired starting point within the streamed multimedia data corresponding with a desired playback portion of the multimedia data;
   identifying a total number of one or more media streams that are included within the desired playback portion of the multimedia data;
   an act of reading ahead a maximum number of data packets in each of the total number of one or more media streams from the desired starting point;
   identifying a normalizing presentation timestamp that corresponds with a presentation starting point for commencing the playback of the desired playback portion of the multimedia data;
   an act of assigning a presentation timestamp to one or more of the maximum number of data packets that has an original timestamp by subtracting the normalizing presentation timestamp from the original timestamp of the one or more data packets; and
   an act of transmitting the one or more maximum number of data packets to at least one rendering device for enabling the total number of one or more media streams to be played back according to presentation timestamp on the at least one rendering device with the intended playback synchronization of the multimedia data.

2. The method of claim 1, wherein the one or more maximum number of data packets comprises a plurality of data packets and wherein said assigning a presentation timestamp to the one or more of the maximum number of data packets is performed for each of the plurality of maximum number of data packets.

3. The method of claim 2, wherein transmitting the one or more maximum number of data packets is performed for each of the plurality of maximum number of data packets.

4. The method of claim 1, wherein the one or more maximum number of data packets comprises a plurality of data packets and wherein identifying the normalizing presentation timestamp comprises an act of identifying a smallest original timestamp of a data packet within the maximum number of data packets.

5. The method of claim 1, wherein the one or more media streams includes at least two media streams.

6. The method of claim 5, wherein the at least two media streams includes at least one audio stream and at least one video stream.

7. The method as recited in claim 1, wherein the desired starting point includes a point other than a cleanpoint.

8. The method of claim 1, wherein the streamed multimedia data is accessed from a storage medium that is remote from the computing system.

9. In a computing system that has access to streamed multimedia data that includes corresponding data packets, wherein at least some of the data packets include original timestamps that corresponds with an intended playback synchronization of the multimedia data, a method for synchronizing the playback of the multimedia data commencing at an identified starting point within the multimedia data, the method comprising:
   identifying a desired starting point within the streamed multimedia data corresponding with a desired playback portion of the multimedia data;
   a step for identifying a normalizing presentation timestamp upon which to base the playback of the desired playback portion of the multimedia data;
   assigning a presentation timestamp to one or more of the maximum number of data packets that has an original timestamp by subtracting the normalizing presentation timestamp from the original timestamp of each of the one or more data packets; and
   an act of transmitting the one or more maximum number of data packets to at least one rendering device for enabling the total number of media streams to be played back according to presentation timestamp on the at least one rendering device with the intended playback synchronization of the multimedia data.

10. The method recited in claim 9, wherein the one or more maximum number of data packets comprises a plurality of data packets.

11. The method of claim 10, wherein the step for identifying a normalizing presentation timestamp includes:
   an act of identifying a total number of media streams that correspond with the desired playback portion of the multimedia data;
   an act of reading ahead the maximum number of data packets in each of the total number of media streams from the desired starting point; and
   an act of identifying a smallest original timestamp of a data packet within the maximum number of data packets, the smallest original timestamp comprising a normalizing presentation timestamp that corresponds with a presentation starting point for playing back the desired playback portion of the multimedia data.

12. The method of claim 11, wherein the maximum number of data packets are queued by the computing system upon performing the act of reading ahead, such that the maximum number of data packets do not need to be read more than once upon seeking to a desired starting point and prior to transmitting the maximum number of data packets to at least one rendering device.

13. A storage device storing computer-executable instructions which, when executed by a computing system, implement a method for synchronizing the playback of multimedia data commencing at a starting point that is identified within the multimedia data at the computing system, wherein the multimedia data includes corresponding data packets, with at least some of the data packets including original timestamps that correspond with an intended playback synchronization of the multimedia data, and wherein the method includes:
  identifying a desired starting point within the streamed multimedia data corresponding with a desired playback portion of the multimedia data;
  identifying a total number of one or more media streams that are included within the desired playback portion of the multimedia data;
  an act of reading ahead a maximum number of data packets in each of the total number of one or more media streams from the desired starting point;
  identifying a normalizing presentation timestamp that corresponds with a presentation starting point for commencing the playback of the desired playback portion of the multimedia data;
  an act of assigning a presentation timestamp to one or more of the maximum number of data packets that has an original timestamp by subtracting the normalizing presentation timestamp from the original timestamp of the one or more data packets; and
  an act of transmitting the one or more maximum number of data packets to at least one rendering device for enabling the total number of one or more media streams to be played back according to presentation timestamp on the at least one rendering device with the intended playback synchronization of the multimedia data.

14. The storage device of claim 13, wherein the storage device includes system memory of the computing system.

15. A storage device storing computer-executable instructions which, when executed by a computing system, implement a method for synchronizing the playback of multimedia data commencing at a starting point that is identified within the multimedia data at the computing system, wherein the multimedia data includes corresponding data packets, with at least some of the data packets including original timestamps that correspond with an intended playback synchronization of the multimedia data, and wherein the method includes:
  identifying a desired starting point within the streamed multimedia data corresponding with a desired playback portion of the multimedia data;
  a step for identifying a normalizing presentation timestamp upon which to base the playback of the desired playback portion of the multimedia data;
  assigning a presentation timestamp to one or more of the maximum number of data packets that has an original timestamp by subtracting the normalizing presentation timestamp from the original timestamp of each of the one or more data packets; and
  an act of transmitting the one or more maximum number of data packets to at least one rendering device for enabling the total number of media streams to be played back according to presentation timestamp on the at least one rendering device with the intended playback synchronization of the multimedia data.

16. The storage device of claim 15, wherein the storage device includes system memory of the computing system.

17. In a computing system that has access to streamed multimedia data, the streamed multimedia data including at least two media streams having corresponding data packets, and wherein at least some of the data packets include original timestamps that corresponds with an intended playback synchronization of the multimedia data, a method for synchronizing the playback of the at least two media streams in reverse and commencing at a starting point that is seeked for within the multimedia data, the method comprising:
  an act of seeking to a desired starting point within the streamed multimedia data, the desired starting point corresponding with a desired playback portion of the multimedia data;
  an act of identifying a total number of media streams that are included within the desired playback portion of the multimedia data;
  an act of reading backwards a maximum number of data packets in each of the total number of media streams from the desired starting point;
  an act of identifying a largest original timestamp of a data packet within the maximum number of data packets, the largest original timestamp comprising a normalizing presentation timestamp that corresponds with a presentation starting point for commencing the playback of the desired playback portion of the multimedia data;
  an act of assigning a presentation timestamp to each one of the maximum number of data packets that has an original timestamp by subtracting the original timestamp of each data packet from the normalizing presentation timestamp; and
  an act of transmitting the maximum number of data packets to at least one rendering device for enabling the total number of media streams to be played back according to presentation timestamp on the at least one rendering device with the intended playback synchronization of the multimedia data.

18. A method as recited in claim 17, wherein the act of assigning a presentation timestamp further includes the act of assigning a presentation timestamp to each data packet with an original timestamp preceding the desired starting point and that is read from the media streams, and until seeking to a new desired starting point, wherein assigning a presentation timestamp to each data packet is performed by subtracting the original timestamp of each data packet from the normalizing presentation timestamp.

19. A method as recited in claim 17, wherein the act of transmitting the maximum number of data packets further includes the act of transmitting each data packet that is read from the media streams to the at least one rendering device.

20. A method as recited in claim 17, wherein the maximum number of data packets are queued by the computing system upon performing the act of reading backwards, such that the maximum number of data packets do not need to be read more than once upon seeking to a desired starting point and prior to transmitting the maximum number of data packets to at least one rendering device.

* * * * *